No. 831,941.  
PATENTED SEPT. 25, 1906.
X. ERLINGER.  
PROCESS OF CARBONATING WATER FOR USE IN BATHS, &c.  
APPLICATION FILED JUNE 16, 1902.
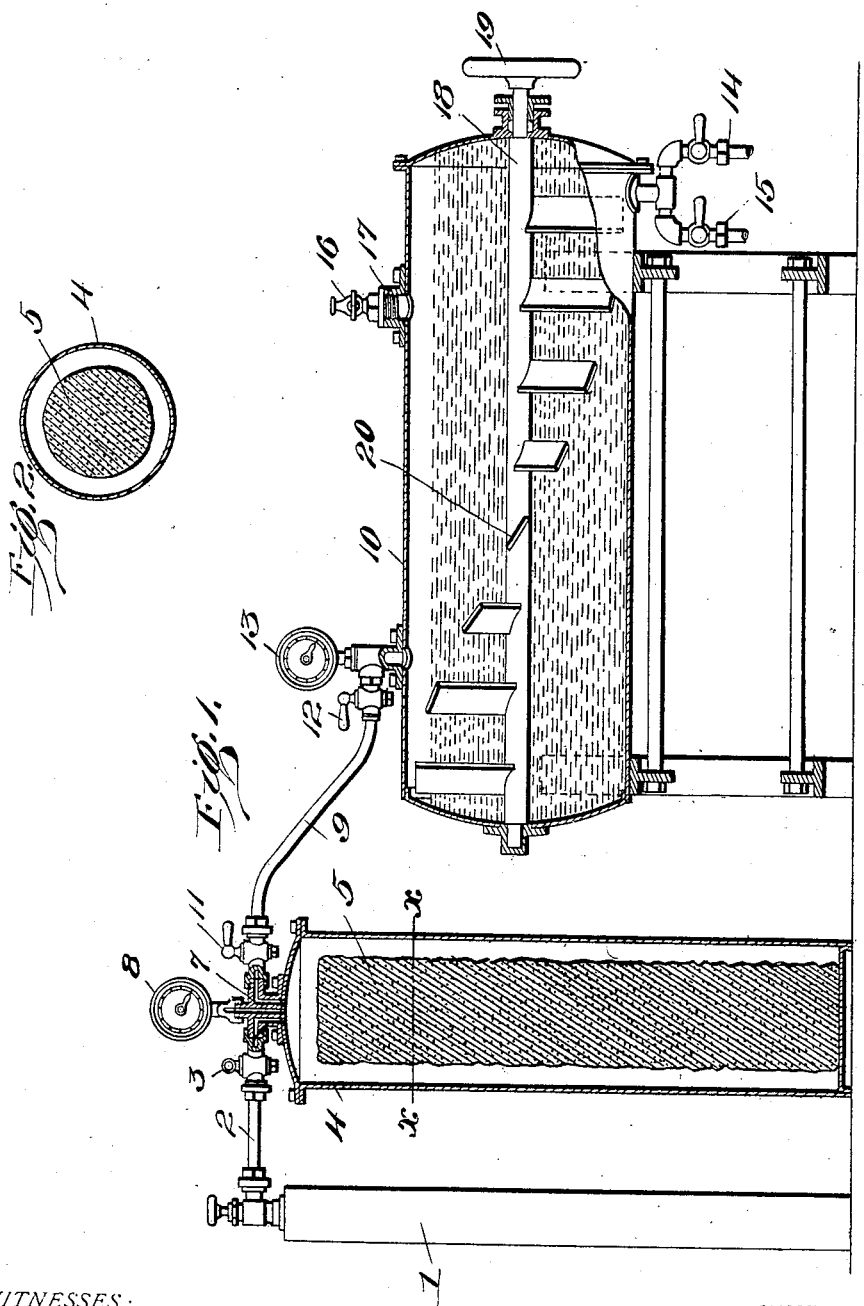
WITNESSES:  
INVENTOR.

UNITED STATES PATENT OFFICE.

XAVER ERLINGER, OF NEW YORK, N. Y., ASSIGNOR TO SIMON BRENTANO, OF NEW YORK, N. Y.

PROCESS OF CARBONATING WATER FOR USE IN BATHS, &c.

No. 831,941.  Specification of Letters Patent.  Patented Sept. 25, 1906.

Application filed June 16, 1902. Serial No. 111,942.

*To all whom it may concern:*

Be it known that I, XAVER ERLINGER, residing at New York, in the county of New York and State of New York, have invented certain new and useful Improvements in Processes of Carbonating Water for Use in Baths, &c., of which the following is a full, clear, and exact description, such as will enable others skilled in the art to which it appertains to make and use the same.

My invention relates to a new and improved process for carbonating and preparing water. Its general object is to produce a carbonated water of superior quality. More specifically, its object is to produce water especially adapted for medicinal baths and superior to the various waters now in use for giving carbonic-acid-gas baths.

It is desirable in all carbonated waters, but especially in those used for giving baths, that the water be thoroughly impregnated with the gas, so that it is not easily given off by it both that the bather may receive the proper therapeutic effect therefrom and to avoid the unpleasant odor which would otherwise result. These and other advantageous results which will be apparent are accomplished by my improved process of treating and preparing the water.

While the process may be carried out in a great variety of ways, it is here described in connection with an apparatus adapted thereto, which apparatus is claimed as such in an application of even date with this application.

In the accompanying drawings, Figure 1 is a vertical longitudinal section of the apparatus. Fig. 2 is a cross-section on line $x\ x$ of Fig. 1.

Similar reference characters refer to similar parts throughout both the views.

Reference character 1 designates a cylinder adapted to contain liquid carbon dioxid connected by the pipe 2, having cock 3, with the receptacle 4, which is shown as of cylindrical form, but may be of any desired form and incloses a body or block of marble 5, having its surfaces roughened and of such a size as nearly to fill the receptacle 4, leaving only a comparatively small space between the face of the block and the inner walls of the receptacle. Coupling 7 at the upper end of the receptacle 4, to which are connected the inlet and outlet pipes, may also be provided with a pressure-gage 8. From this coupling a pipe 9 leads to the mixing-tank 10, suitable cocks 11 and 12 being provided for regulating the flow through said pipe, and a pressure-gage 13 for indicating the pressure on the inside of the mixing-tank. Mixing-tank 10 is provided with a water-inlet pipe 14, an exit-pipe 15, and a vent 16. This vent is preferably removable and is screwed into a flanged opening 17, so that suitable saline solutions may be introduced into the tank when desired. Through the tank 10 extends a shaft 18, rotatable by means of a handle 19 and provided with mixing-blades 20, which are preferably arranged spirally, as shown.

The way in which the above-described apparatus is used in carrying out my process will now be clear. Cock 11 is closed and the one at 3 opened so as to provide communication between the carbon-dioxid cylinder and the intermediate cylinder. The liquid carbon dioxid is allowed to pass into the intermediate cylinder under pressure until a sufficient amount is contained therein, as shown by the pressure-gage. Then the cock 3 is closed and the carbon dioxid allowed to remain in the intermediate cylinder and in contact with the roughened block of marble for a suitable length of time, it having been found by experiment that from twenty to thirty minutes is necessary in order to accomplish the best results. The pipes are then opened between the intermediate cylinder and mixing-tank and the carbon dioxid which is now in the form of gas is allowed to pass into the tank, where it is thoroughly intermingled with the water by means of the agitator-blades. It is then in shape to be drawn off through the exit-pipe 15 for use as desired, whether mixed with hot water or otherwise. When the gas in the intermediate cylinder is exhausted, the operation would be repeated by charging said cylinder with a fresh supply and allowing it to stand, as before. This applies to the first charge, and if the apparatus is then allowed to stand for any length of time without being used it will be necessary to take the same time for the next charge. It has been found, however, that where the cycle of operations is repeated the subsequent charges of the intermediate cylinder require successively less time, and if used continuously the process becomes almost a constant one, the time during which the carbon dioxid, whether in the form of liquid or gas, remains in the intermediate cylinder, even when both the inlet and outlet pipes are open for the free passage thereof, being sufficient to produce the desired effect. Where in the claims it is stated that the carbon dioxid remains for a suitable time in the intermediate cylinder it is not intended to limit the claims thereby to any time other than such as may be necessary in order to secure proper action.

It has been found by experiment that water treated according to the above-described process has all the quality of the natural carbonic-acid waters which are used for similar purposes and that it is widely differentiated from the various other artificial carbonated waters produced by the processes now in use. In the natural baths the carbonic-acid gas is so held in the water that a fair percentage of it deposits itself on the surface of the bather in small bubbles and does not escape into the air. It has been found that unless this result be reached the baths are practically useless. Similar results are obtained by the use of waters treated according to this process, which results have never been before obtained with artificial waters. The water treated according to this process may be used in baths with the effect that during the entire immersion of the patient the carbonic-acid gas held by the water is acting uniformly and constantly upon the patient. Moreover, this water resembles the natural water in that where a bath is begun with a pressure of from twenty-five to thirty pounds in the water a considerable quantity of gas will remain for a suitable time, ranging from ten minutes to half an hour, during which time the bath may be given. With the ordinary artificially-carbonated waters with pressure beginning at from twenty-five to thirty pounds the gas escapes within much less than ten minutes. A further evidence of the more intimate mixture of the gas with the water when prepared according to this process is found in the fact that the bubbles in the water appear very much smaller, showing that the gas is in a more finely divided state. It has also been found by experiment that a given quantity of liquid carbon dioxid will produce a very much larger quantity of carbonated water than with the known processes. Greater stability is evidenced and an advantage is obtained, in that it is possible in using water treated according to this process to mix therewith hot water at a very high temperature which is not possible with the ordinary carbonated waters, in that the mixing of the very hot water and the ordinary carbonated water will immediately discharge the gas.

It has been found by experiment that it is possible and advantageous to introduce the hot water into the bath at a temperature of not less than 200° Fahrenheit and also that the hot water should be introduced as near as possible at the bottom of the receptacle in which the carbonated water is held.

Having described my process, what I claim as new, and desire to secure by Letters Patent, is—

1. The process of treating water, which consists in passing liquid carbon dioxid into a receptacle partially filled with a body or block of marble having a roughened surface, allowing it to remain there under pressure for a suitable time and until it has become gasified in whole or part, thence passing said gas into a mixing-tank and mixing it with a suitable volume of water.

2. The process of carbonating and treating water for the purposes set forth, which consists in passing liquid carbon dioxid into a receptacle where it shall come in free contact with marble, allowing it to remain there under pressure for a suitable time and until it has become gasified in whole or part, and thence passing said gas into a mixing-tank where it is suitably mixed with water.

3. The process of treating water, which consists in passing compressed carbon dioxid over marble and mixing the resulting gas with water.

4. The process which consists in confining carbon dioxid under pressure with marble and mixing the resulting gas with a liquid.

5. The process of treating water, which consists in reducing pressure upon liquid carbon dioxid, confining the same under reduced pressure with marble, conducting the resulting gas into water and mixing the same therewith.

In testimony whereof I affix my signature in the presence of two witnesses.

XAVER ERLINGER.

Witnesses:
I. C. DELANEY,
H. M. SEAMANS.